(12) United States Patent
Kim et al.

(10) Patent No.: US 11,059,082 B2
(45) Date of Patent: Jul. 13, 2021

(54) METHOD FOR REMOVING CESIUM IN CLAY MINERAL USING HYDROGEN PEROXIDE

(71) Applicant: Korea Atomic Energy Research Institute, Daejeon (KR)

(72) Inventors: Il Gook Kim, Daejeon (KR); Kune Woo Lee, Daejeon (KR); Chan Woo Park, Uiwang-si (KR); In Ho Yoon, Daejeon (KR); Hee Man Yang, Daejeon (KR); Bum Kyoung Seo, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 205 days.

(21) Appl. No.: 16/154,724

(22) Filed: Oct. 9, 2018

(65) Prior Publication Data

US 2019/0275573 A1 Sep. 12, 2019

(30) Foreign Application Priority Data

Mar. 12, 2018 (KR) .......................... 10-2018-0028902
Mar. 29, 2018 (KR) .......................... 10-2018-0036384

(51) Int. Cl.
| | | |
|---|---|---|
| B09C 1/00 | (2006.01) | |
| B09C 1/08 | (2006.01) | |
| G21F 9/30 | (2006.01) | |
| C22B 7/00 | (2006.01) | |
| C22B 26/10 | (2006.01) | |
| C01D 17/00 | (2006.01) | |
| G21F 9/12 | (2006.01) | |

(52) U.S. Cl.
CPC ................ *B09C 1/08* (2013.01); *C01D 17/00* (2013.01); *C22B 7/006* (2013.01); *C22B 26/10* (2013.01); *G21F 9/12* (2013.01); *G21F 9/30* (2013.01)

(58) Field of Classification Search
CPC ............ C22B 7/006; C22B 26/10; B09C 1/08
See application file for complete search history.

(56) References Cited

FOREIGN PATENT DOCUMENTS

| JP | 2013094723 A | | 5/2013 |
|---|---|---|---|
| KR | 2005-120312 A | * | 12/2005 |
| KR | 20180000132 A | | 11/2018 |
| WO | WO2013186873 A1 | | 12/2013 |

* cited by examiner

*Primary Examiner* — Steven J Bos
(74) *Attorney, Agent, or Firm* — Don D Cha; HDC Intellectual Property Law, LLP (57) ABSTRACT

The present invention relates to a method for removing cesium in a clay mineral using hydrogen peroxide. According to the present invention, cesium in a clay mineral is removed using hydrogen peroxide, which serves to induce interlayer expansion of the clay mineral to allow a cation to easily enter an interlayer of the clay mineral, and thus cesium desorption efficiency can be further improved. Also, the method according to the present invention can be efficiently used to restore soil in residential areas widely contaminated with a radionuclide when a major accident such as Fukushima nuclear accident occurs as well as various sites of atomic energy facilities contaminated with a radionuclide. Also, since radiation-contaminated soil is treated with only hydrogen peroxide and cations, secondary environmental pollution caused by wastes can be significantly reduce and the waste disposing cost can also be saved.

9 Claims, 6 Drawing Sheets

METHOD FOR REMOVING CESIUM IN CLAY MINERAL USING HYDROGEN PEROXIDE

CROSS-REFERENCE TO RELATED APPLICATION

This application claims priority to and the benefit of Korean Patent Application No. 2018-0028908, filed on Mar. 12, 2018, and Korean Patent Application No. 2018-0036384, filed on Mar. 29, 2018, the disclosure of which is incorporated herein by reference in its entirety.

FIELD OF THE INVENTION

The present invention relates to a method for removing cesium in a clay mineral using hydrogen peroxide.

BACKGROUND OF THE INVENTION

After a nuclear power plant is decommissioned, soil and groundwater in its vicinity are contaminated with a radionuclide, which is caused by unplanned leaks and the diffusion of nuclides, ionized by water in soil, into the surface of the ground or into a depthwise direction of soil. Among radionuclides, particularly, cesium ($^{137}Cs$) is generally known to contaminate soil down to a depth of about 10 cm and be selectively and strongly adsorbed on clay minerals in soil, and thus it is difficult to remove cesium through a common method of purifying soil.

After the Fukushima nuclear accident in Japan a large amount of radioactivity-contaminated soil wastes was generated, then research has been actively conducted to solve the problem of the soil wastes. As a technique for removing cesium adsorbed on clay minerals, the desorption of cesium through cation exchange is mainly studied, but it is problematic for a very low removal rate with respect to selectively adsorbed cesium. In order to solve this problem, thermal treatment method through which cesium is vaporized and removed at a high temperature of 1,000° C. or more was developed, and performed in a laboratory scale. However, despite a high cesium removal rate thereof, this technology has problems that maintaining stability is difficult, energy consumption is high, and generated ashes should be disposed when it comes to treat a large amount of soil. In addition, a method for heating a high concentration (6 M) of acid (nitric acid and hydrochloric acid) at about 90° C. was proposed, but it also has problems in that it is difficult to handle a high concentration acid, costs are increased due to difficulty in reusing an acidic solution, a large-sized apparatus is required to treat a large amount of soil, and a considerable amount of energy is consumed.

Since clay minerals generally have a negative charge, they exhibit high cation exchange capacity and thus can strongly adsorb a cation. However, the type of adsorbable cation and cation exchange capacity may vary depending on the type and state of a clay mineral.

In particular, for a 2:1 lattice type clay mineral including, as basic elements thereof, two tetrahedral sheets ($SiO_4$) and an octahedral sheet ($Al(OH)_6$) joined to each other, there is an interlayer region between two such lattices. A lattice type clay mineral that is not easily swollen under wet conditions has a high density of cations present between the lattices, such that the adsorption of cesium may take place preferentially between the lattices rather than outside thereof. Also, since cesium adsorbed between the lattices is strongly bonded and stably fixed, forming an inner-sphere complex, it is very difficult to remove cesium.

PRIOR-ART DOCUMENTS

Patent Documents

Korean Patent Publication No. 10-2005-0120312

SUMMARY OF THE INVENTION

The present invention provides a method for removing cesium in a clay mineral using hydrogen peroxide and an apparatus for treating cesium-contaminated clay.

However, technical problems to be achieved by the present invention are not limited to the aforementioned problems, and other problems that are not mentioned may be clearly understood by a person skilled in the art from the following description.

The present invention is designed to solve the problems of the prior art, and the present invention provides a method for removing cesium in a clay mineral, including: (a) mixing a cesium-contaminated clay mineral with hydrogen peroxide to induce interlayer expansion; (b) desorbing the cesium from the clay mineral using a ion-exchangeable cation; and (c) separating the desorbed cesium from the clay mineral.

In addition, the present invention provides an apparatus for treating cesium-contaminated clay, including: a reaction unit configured to mix hydrogen peroxide, a ion-exchangeable cation, and a cesium-contaminated clay mineral to induce a reaction; and a solid-liquid separation unit configured to separate the reaction products into a cesium-free clay mineral and a cesium-containing reaction solution.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF THE INVENTION

During research on a method for effectively removing cesium in a clay mineral, the present inventors have found that removal efficiency of cesium is improved when an explosion of oxygen gas, which is produced when hydrogen peroxide is decomposed, is applied to induce interlayer expansion in a clay mineral. Based on this fact, the present invention has been completed.

Hereinafter, the present invention will be described in detail.

The present invention provides a method for removing cesium in a clay mineral, including (a) mixing a cesium-contaminated clay mineral with hydrogen peroxide to induce interlayer expansion; (b) desorbing the cesium from the clay mineral using a ion-exchangeable cation; and (c) separating the desorbed cesium from the clay mineral.

Figure 1:
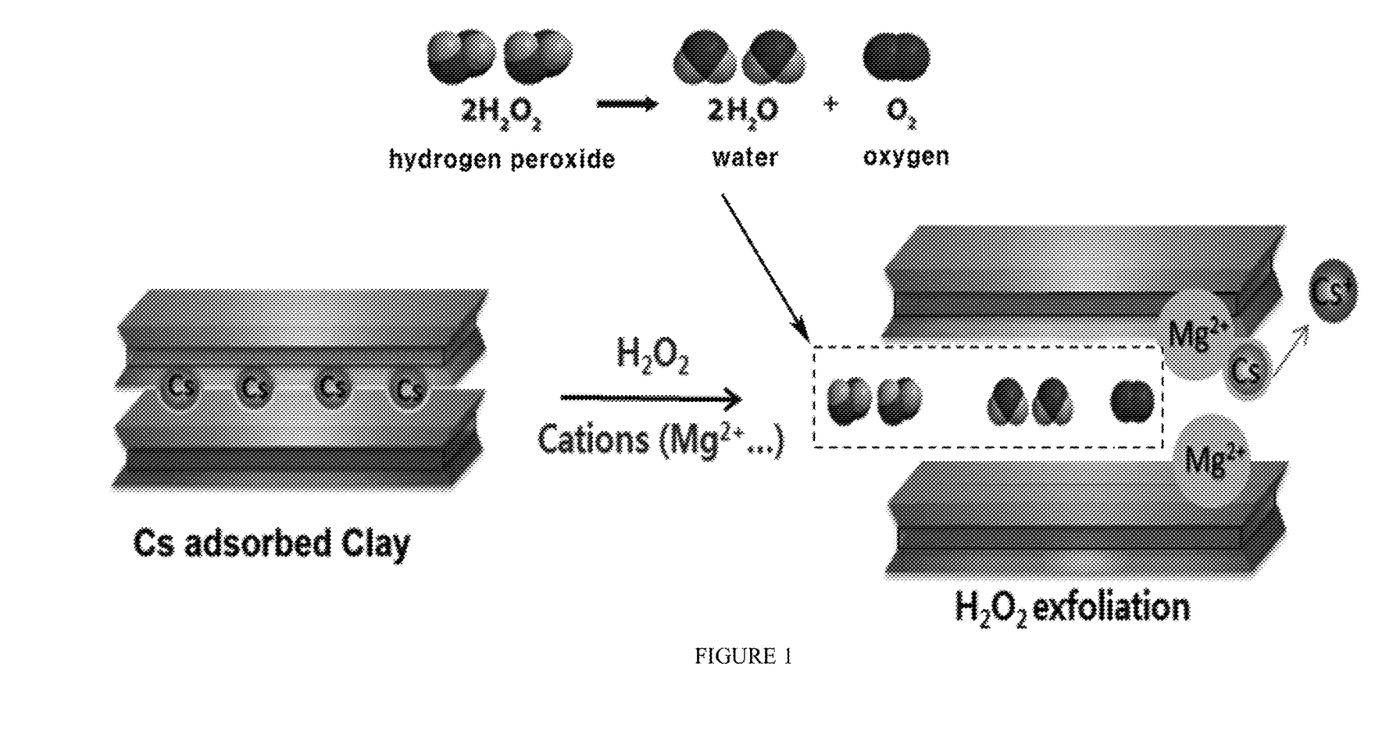
FIG. 1 is a schematic diagram briefly illustrating a method for removing cesium from a cesium-adsorbed clay mineral by inducing interlayer expansion using hydrogen peroxide and then cation exchange according to an embodiment of the present invention.

FIG. 1 is a schematic diagram briefly illustrating the method for removing cesium in a clay mineral according to an embodiment of the present invention.

As shown in FIG. 1, the method for removing cesium in a clay mineral according to an embodiment of the present invention is carried out by mixing a cesium-contaminated clay mineral with hydrogen peroxide to induce interlayer expansion of the clay mineral and separating cesium from the clay mineral through cation exchange.

First, the method for removing cesium in a clay mineral according to an embodiment of the present invention includes mixing a cesium-contaminated clay mineral with hydrogen peroxide to induce interlayer expansion [step (a)].

The term "clay mineral" used herein refers to mineral constituting clay. Clay contains primary minerals such as quartz, feldspar but is mainly composed of secondary minerals, and the primary minerals are generally contained in a small amount. The secondary minerals refer to minerals that are formed by altering primary minerals constituting rock or parent material or by recombining components that have been dissolved by the weathering of primary minerals. Since such a clay mineral has fine grains, it exhibits a large surface area and high reactivity, and the content and type thereof significantly affect physicochemical properties of soil.

Since the clay mineral generally has a negative charge, it exhibits high cation exchange capacity and thus can strongly adsorb a cation. The clay mineral is fundamentally formed by tetrahedral sheets ($SiO_4$) and an octahedral sheet ($Al(OH)_6$) sharing oxygen and a hydroxyl group. A main cation in the tetrahedral sheet, $SiO^{4+}$, is isomorphously substituted with $Al^{3+}$ or $Fe^{3+}$ to form a negative charge, and the tetrahedral sheets and the octahedral sheet share oxygen and a hydroxyl group to form a $[SiAlO_4]^-$ layer.

Specifically, the clay minerals are classified into those having a 1:1 layered structure including one tetrahedral sheet and one octahedral sheet joined to each other and those having a 2:1 layered structure including two tetrahedral sheets and one octahedral sheet joined to each other, in both cases the tetrahedral sheet(s) and the octahedral sheet share oxygen and a hydroxyl group. A representative example of a clay mineral with a 1:1 layered structure is kaolinite, and representative examples of a clay mineral with a 2:1 layered structure include smectite, vermiculite, mica, and illite.

The adsorption capacity and selectivity in adsorption of cesium may vary even in clay minerals having the same structure and chemical composition because there are various sites on clay minerals where cesium can be adsorbed. Since a 1:1 lattice type clay mineral is not easily swollen even though there is a large amount of water in the surroundings, it is difficult for a cesium ion to enter the inside of a lattice, and thus cesium, in its hydrated form, is mainly adsorbed onto the outside of a clay mineral through ion exchange. A 2:1 lattice type clay mineral has an interlayer between two such lattices, and the types of the clay minerals are classified according to the type of cations in the interlayers or the weathering degree of the clay minerals. It is considered that clay minerals with high expandability, such as smectite or vermiculite, can easily adsorb cesium inside a layered structure thereof, whereas clay minerals with low expandability under wet conditions can adsorb cesium inside a layered structure thereof through a frayed edge site due to a cation present in the interlayer. In this case, although cesium can be adsorbed onto the outside of the clay mineral as well as in the interlayers, the interlayers have a high charge density, and thus the adsorption of cesium may take place preferentially in the interlayers. Also, since cesium adsorbed between the lattices is strongly bonded and stably fixed, forming an inner-sphere complex, it is very difficult to remove cesium. Here, the "interlayer" is a concept that covers both an interlayer region between layers and a frayed edge site.

That is, the method for removing cesium according to the present invention is for removing cesium adsorbed in interlayers of a clay mineral, and the clay mineral preferably has a 2:1 layered structure, but the present invention is not limited thereto.

Specifically, the clay mineral may be selected from the group consisting of hydrobiotite; a smectite-based mineral; vermiculite; a mica-based mineral; and illite. More specifically, the smectite-based mineral may be selected from the group consisting of montmorillonite, beidellite, nontronite, hectorite, and sauconite, and the mica-based mineral may be selected from the group consisting of biotite, muscovite, phlogopite, and lepidolite, but the present invention is not limited thereto.

In the present invention, after mixing with the clay mineral, hydrogen peroxide is decomposed into oxygen gas and water molecules. In this case, the produced oxygen gas may be accumulated in a layered structure of the clay mineral and afterward exploded to induce expansion between layers in the clay mineral. In addition, cations to be added in the subsequent step [step (b)] may be bonded with water molecules decomposed from hydrogen peroxide to further promote interlayer expansion.

According to one embodiment of the present invention, the hydrogen peroxide may be added as a 30 to 50% aqueous solution, but the present invention is not limited thereto.

Next, the method for removing cesium in a clay mineral according to an embodiment of the present invention includes desorbing the cesium from the clay mineral using a ion-exchangeable cation [step (b)] and separating the desorbed cesium from the clay mineral [step (c)].

In this case, the desorption of cesium using a ion-exchangeable cation [step (b)] may be carried out sequentially after the mixing of a cesium-contaminated clay mineral with hydrogen peroxide [step (a)] or concurrently with the mixing of a cesium-contaminated clay mineral with hydrogen peroxide [step (a)], or a mixture of hydrogen peroxide and a cation may be prepared first and then mixed with a cesium-contaminated clay mineral.

In the present invention, the cation may be a divalent cation. Specifically, the divalent cation may be selected from the group consisting of a magnesium ion, a calcium ion, and a barium ion, and preferably is a magnesium ion, but the present invention is not limited thereto as long as it can desorb cesium from a clay mineral through cation exchange.

In the present invention, a concentration of the cation may be determined according to a concentration of contaminating cesium ions, and preferably is in a range of 0.1 to 1.0 M, but the present invention is not limited thereto.

The separation of cesium is for removing cesium desorbed from a clay mineral due to a cation, and may be carried out through a method known in the related art such as centrifugation or the like.

In addition, the present invention provides an apparatus for treating cesium-contaminated clay, which includes reaction units 1, 2 configured to mix hydrogen peroxide, a ion-exchangeable cation, and a cesium-contaminated clay mineral to induce a reaction and a solid-liquid separation unit 4 configured to separate the reaction products into a cesium-free clay mineral and a cesium-containing reaction solution.

Figure 6:
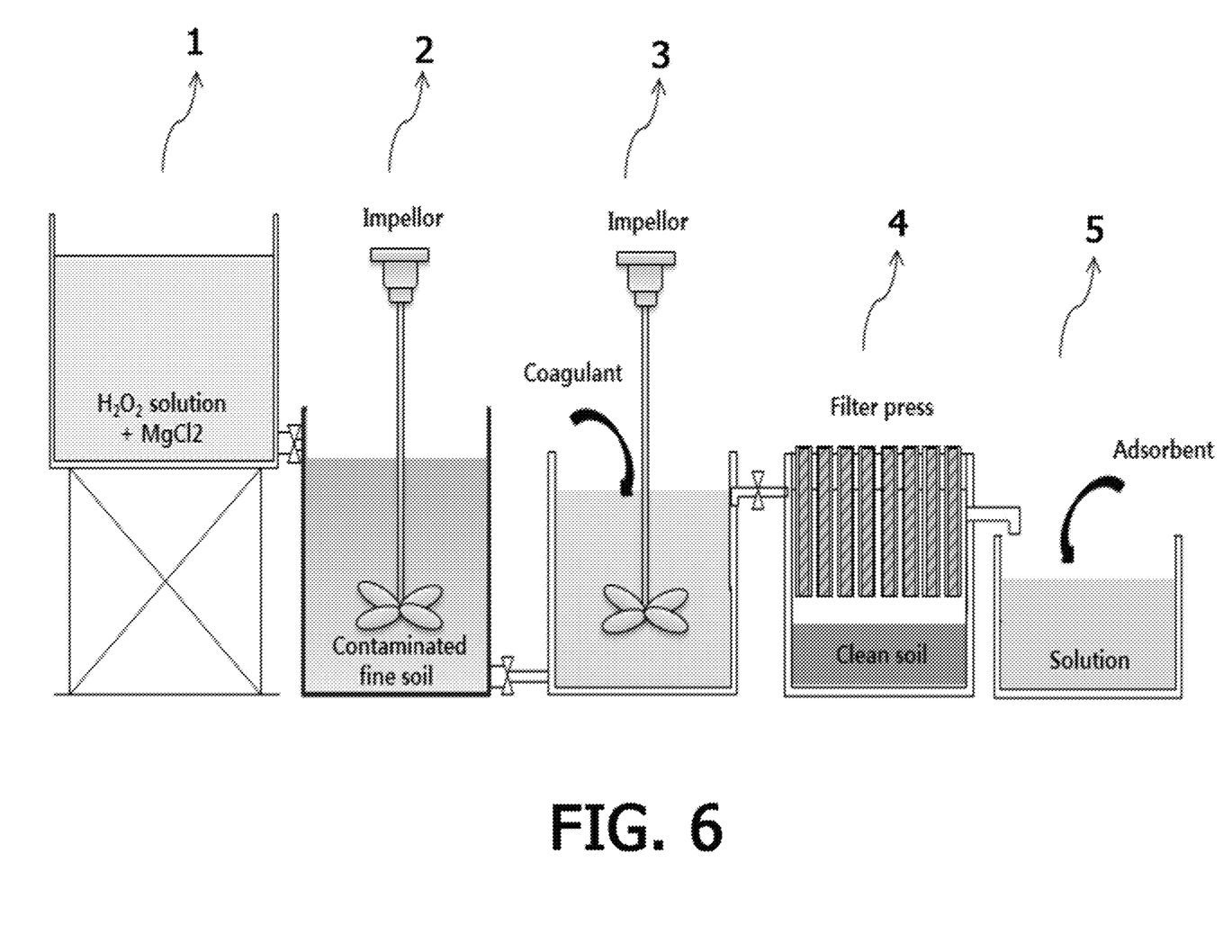
FIG. 6 is a schematic diagram of an apparatus for treating cesium-contaminated clay according to an embodiment of the present invention.

FIG. 6 is a schematic diagram of an apparatus for treating cesium-contaminated clay according to an embodiment of the present invention.

The apparatus for treating cesium-contaminated clay according to the present invention includes the reaction units 1, 2 configured to desorb cesium from a clay mineral using hydrogen peroxide and a ion-exchangeable cation.

According to one embodiment of the present invention, the reaction units may include a first reaction unit 1 configured to react hydrogen peroxide and a ion-exchangeable cation and a second reaction unit 2 configured to mix a cesium-contaminated clay mineral with the mixture of hydrogen peroxide and a cation to induce a reaction.

In this case, a hydrogen peroxide solution and a ion-exchangeable cation are first mixed in the first reaction unit 1 to induce a reaction, and the mixture is then transferred to the second reaction unit 2 and mixed with a cesium-contaminated clay mineral. As a result, interlayers may be expanded and cesium may be desorbed at the same time.

According to another embodiment of the present invention, the reaction units may include a first reaction unit configured to mix a cesium-contaminated clay mineral with hydrogen peroxide to induce a reaction and a second reaction unit configured to mix the clay mineral having reacted with hydrogen peroxide with a cation to induce a reaction.

In this case, a cesium-contaminated clay mineral is reacted with hydrogen peroxide in the first reaction unit to cause interlayer expansion of the clay mineral, and afterwards, cation exchange is carried out in the second reaction unit, causing cesium to be desorbed.

The apparatus for treating cesium-contaminated clay according to the present invention includes the solid-liquid separation unit 4 configured to separate cesium desorbed in the reaction units and a cesium-free clay mineral. In the solid-liquid separation unit 4, a solid portion including a clay mineral from which cesium has been desorbed and a liquid portion including the desorbed cesium are separated for the purpose of obtaining clay which is not contaminated with radioactive cesium. Specifically, the solid-liquid separation may be carried out using a filter press, but the present invention is not limited thereto as long as a method is capable of separating solid-phase clay and a liquid-phase reaction solution.

According to one embodiment of the present invention, a coagulation unit 3 may be further included between the reaction units 1, 2 and the solid-liquid separation unit 4. The coagulation unit 3 is a unit for increasing separation efficiency of the solid-liquid separation unit by coagulating clay grains using a coagulant.

In the present invention, the coagulant is used for coagulating soil containing clay minerals, and may be used without limitation as long as it is known to those skilled in the art.

According to one embodiment of the present invention, a post-treatment unit 5 configured to dispose of cesium from the reaction solution may be further included at the rear end of the solid-liquid separation unit 4. The post-treatment unit 5 is for disposing of cesium contained in the reaction solution separated in the solid-liquid separation unit 4, and cesium may be disposed of using an adsorbent, but the present invention is not limited thereto.

In the apparatus for treating cesium-contaminated clay according to the present invention, the descriptions of the type of clay mineral, a concentration of hydrogen peroxide, and the type of cation are the same as those provided above.

According to the present invention, cesium in a clay mineral is removed using hydrogen peroxide, which serves to effectively expand interlayers of the clay mineral, and cesium may be easily removed from the clay mineral through exchange of a cesium ion and a cation.

Hereinafter, the present invention will be described in further detail with reference to examples thereof. It should be clear to those skilled in the art that the following examples are merely presented to exemplify the present invention, and the scope of the present invention is not limited to the following examples.

EXAMPLES

Example 1. Removal of Cesium in Hydrobiotite Using Hydrogen Peroxide

Cesium-contaminated hydrobiotite and a 35% hydrogen peroxide ($H_2O_2$) aqueous solution were mixed in a solid-liquid ratio of 1:100 at room temperature to separate layers of the clay mineral. Then, 0.1 M magnesium chloride ($MgCl_2$) was added thereto, and the mixture was stirred at room temperature to induce a reaction for about 24 hours.

Hydrogen peroxide was decomposed into water and oxygen, and the oxygen gas thus produced was accumulated in a layered structure of the clay mineral and thus exploded to induce interlayer expansion of the clay mineral. A divalent cation was added to the clay mineral whose interlayers had been expanded by hydrogen peroxide to induce cation exchange, and thus cesium was separated. FIG. 1 is a schematic diagram briefly illustrating a method for removing cesium from a cesium-adsorbed clay mineral by inducing interlayer expansion of the clay mineral using hydrogen peroxide and then cation exchange according to the present invention.

After the cation exchange was completed, centrifugation was carried out in a centrifuge at 5,000 rpm or more for about 10 minutes to separate, from the clay mineral, a solution containing desorbed cesium.

Next, cesium was removed from the cesium-containing solution using a metal ferrocyanide-based adsorbent.

Experimental Example 1. Evaluation of Cesium Desorption Caused by Interlayer Expansion and Ion Exchange The interlayer expansion of the cesium-contaminated clay mineral and the cesium desorption caused by a divalent cation in Example 1 were identified through an X-ray diffraction (XRD) analysis. The clay used in the experiment, hydrobiotite, which contains both expandable and non-expandable clay minerals, exhibited a strongest peak at $2\theta=7.4°$ ($d=1.2$ nm) before treatment with hydrogen peroxide and a divalent cation, a characteristic peak of vermiculite, which is an expandable clay mineral, at $2\theta=6.2°$ ($d=1.4$ nm), and a weak characteristic peak of biotite, which is a non-expandable clay mineral, at $2\theta=8.7°$ ($d=1.0$ nm).

Figure 2:
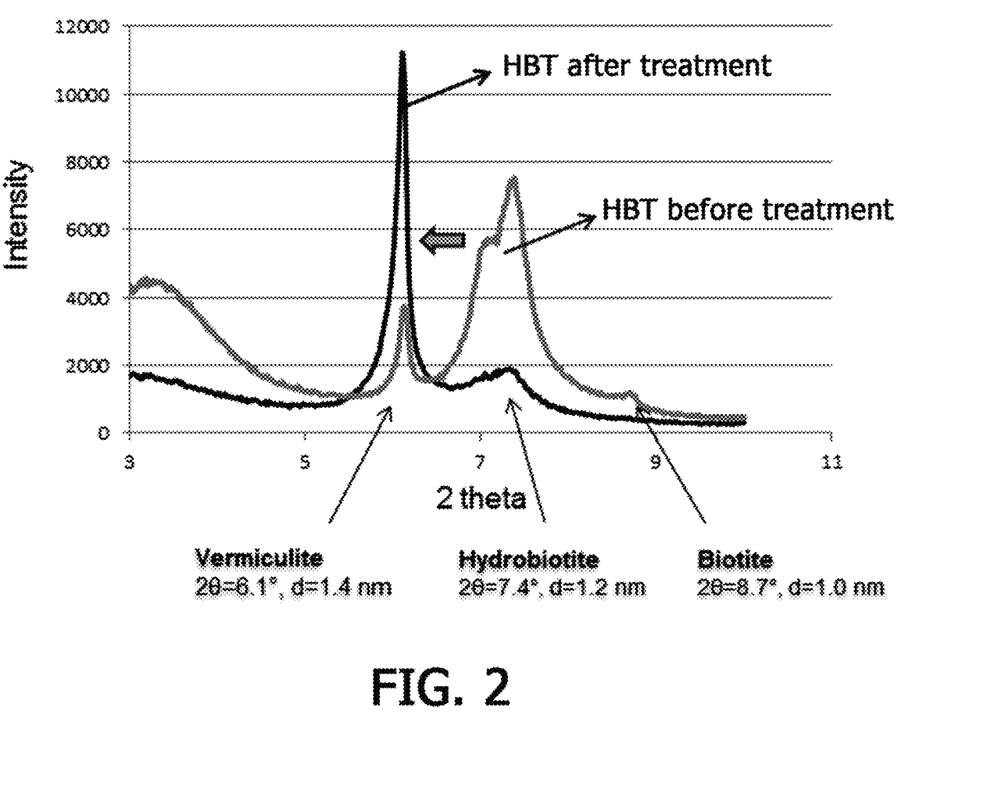
FIG. 2 is an X-ray diffraction (XRD) analysis result before and after a clay mineral is treated with hydrogen peroxide and a divalent cation according to an embodiment of the present invention.

Hydrogen peroxide and 0.1 M magnesium chloride ($MgCl_2$, $Mg^{2+}$) were added to each of clay samples as in Example 1 to expand interlayers. As a result, it can be confirmed that the peak of non-expandable biotite disappeared and most of the hydrobiotite peak had shifted to the peak of expandable vermiculite. From this result, it can be seen that the clay mineral contains oxygen gas and water molecules produced upon the decomposition of hydrogen peroxide, and thus interlayer expansion occurs due to a magnesium ion hydrated by the decomposition products (FIG. 2).

Experimental Example 2. Comparison of Cesium Desorption Effect

In order to identify an effect of desorbing cesium according to a concentration of hydrogen peroxide or the type of cation in the removal of cesium from a clay mineral, an experiment for removing cesium was carried out in the same manner as in Example 1 except that experimental conditions were varied as follows to compare an effect of desorbing cesium.

Comparative Example 1-1 only 35% hydrogen peroxide ($H_2O_2$) aqueous solution was mixed.

Comparative Example 1-2 only 50% hydrogen peroxide ($H_2O_2$) aqueous solution was mixed.

Comparative Example 1-3 a 35% hydrogen peroxide ($H_2O_2$) aqueous solution was mixed and then an ammonium ion (0.1 M $NH_4Cl$), which is a monovalent cation, was added instead of a magnesium ion.

Figure 3:
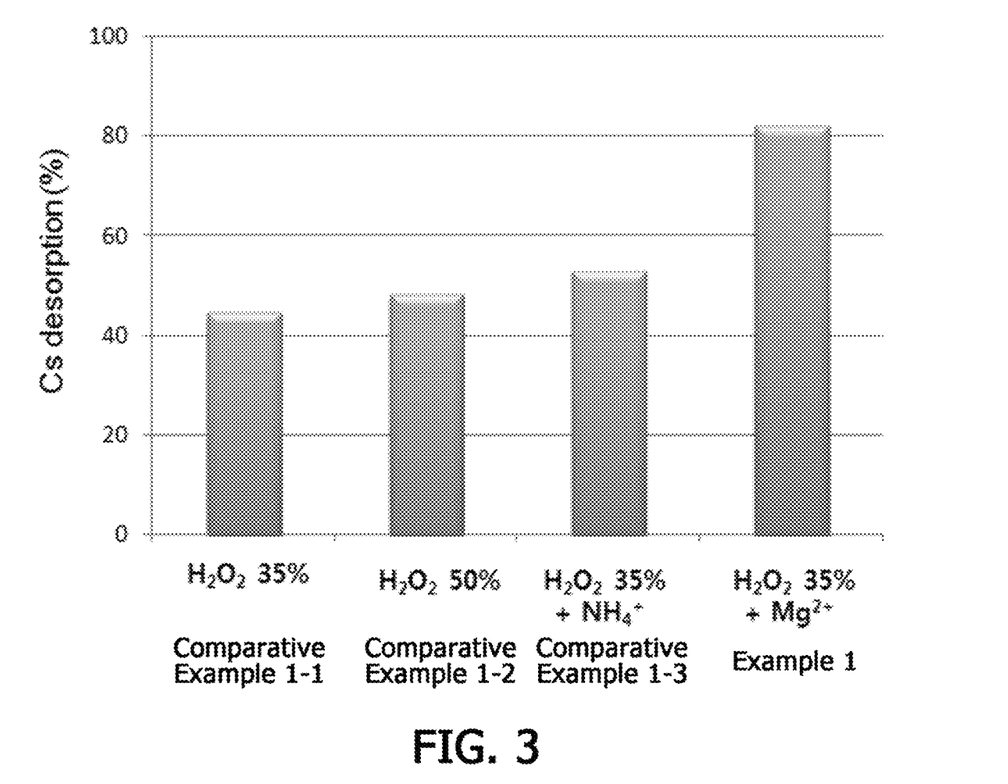
FIG. 3 is a comparison result of the efficiency of cesium desorption from hydrobiotite according to an embodiment of the present invention.

As a result, as shown in FIG. 3, when only hydrogen peroxide was used without the addition of a cation, there was no significant change in an effect of desorbing cesium even though a concentration of hydrogen peroxide increased from 35% to 50%. Also, it can be confirmed that when a magnesium ion, which is a divalent cation, was used together with hydrogen peroxide, the degree of cesium desorption increased by about 30% compared to when an ammonium ion, which is a monovalent cation, was used. It is considered that a magnesium ion, which is a divalent cation, is more advantageous for desorbing cesium because it has higher electrovalence so that ion exchange with cesium more easily occurs, and an interlayer of a clay mineral is further expanded due to the larger size of hydrated ion.

Example 2. Comparison of Cesium Desorption Effect in Montmorillonite

In order to identify an effect of desorbing cesium using hydrogen peroxide in various clay minerals, an experiment was carried out for montmorillonite, which is one of the expandable clays. An experiment for removing cesium was carried out in the same manner as in Example 1 except that cesium-contaminated montmorillonite was used instead of cesium-contaminated hydrobiotite.

In addition, in order to compare an effect of desorbing cesium from montmorillonite according to reaction conditions, experimental conditions were varied as follows.

Comparative Example 2-1 only 35% hydrogen peroxide ($H_2O_2$) aqueous solution was mixed.

Comparative Example 2-2 only 50% hydrogen peroxide ($H_2O_2$) aqueous solution was mixed.

Comparative Example 2-3 a 35% hydrogen peroxide ($H_2O_2$) aqueous solution was mixed and then an ammonium ion (0.1 M $NH_4Cl$), which is a monovalent cation, was added instead of a magnesium ion.

Figure 4:
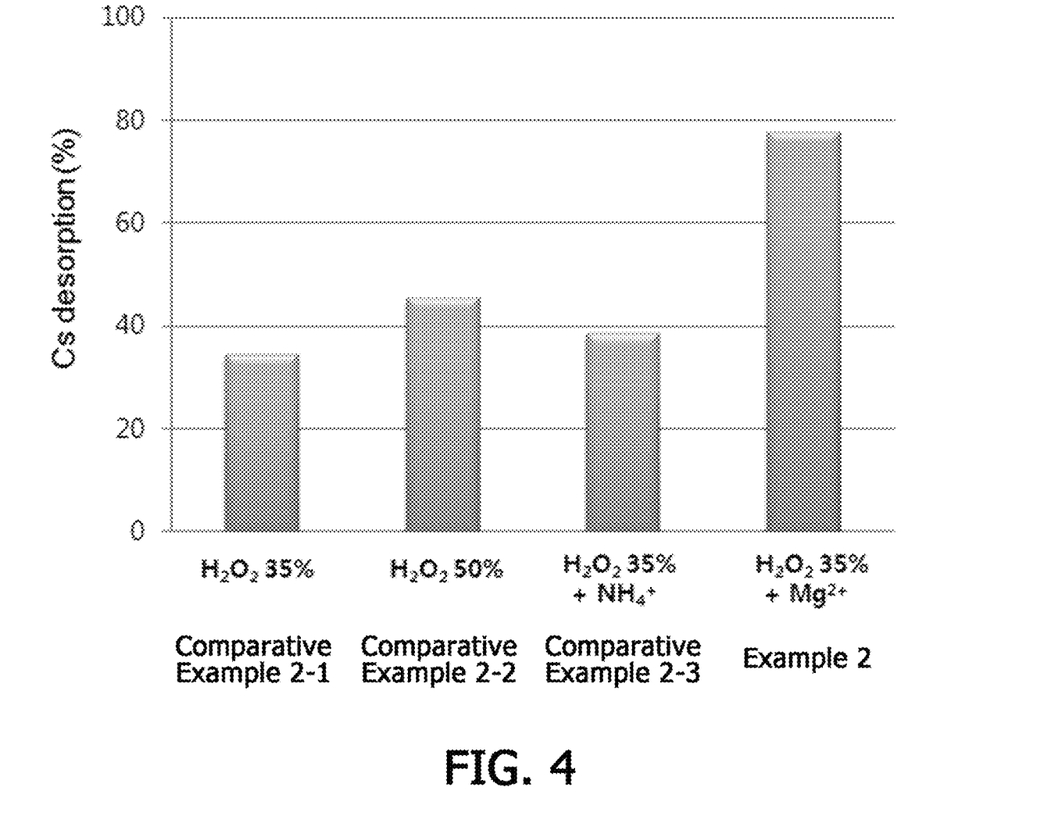
FIG. 4 is a comparison result of the efficiency of cesium desorption from montmorillonite according to an embodiment of the present invention.

As a result, as shown in FIG. 4, when only hydrogen peroxide was used without the addition of a cation, there was no significant but only slight increase in an effect of desorbing cesium when a concentration of hydrogen peroxide increased from 35% to 50%. Also, it can be seen that when an ammonium ion, which is a monovalent cation, was used together with hydrogen peroxide, a desorption effect was rather decreased, instead of increasing, compared to when only 50% hydrogen peroxide was used, whereas a desorption efficiency was significantly increased by about 2-fold when a magnesium ion was used together with hydrogen peroxide.

Example 3. Comparison of Cesium Desorption Effect in Illite

In order to identify an effect of desorbing cesium using hydrogen peroxide in various clay minerals, an experiment was carried out for illite, which is one of the non-expandable clays. An experiment for removing cesium was carried out in the same manner as in Example 1 except that cesium-contaminated illite was used instead of cesium-contaminated hydrobiotite.

In addition, in order to compare an effect of desorbing cesium from illite according to reaction conditions, experimental conditions were varied as follows.

Comparative Example 3-1 only 35% hydrogen peroxide ($H_2O_2$) aqueous solution was mixed.

Comparative Example 3-2 only 50% hydrogen peroxide ($H_2O_2$) aqueous solution was mixed.

Comparative Example 3-3 a 35% hydrogen peroxide ($H_2O_2$) aqueous solution was mixed and then an ammonium ion (0.1 M $NH_4Cl$), which is a monovalent cation, was added instead of a magnesium ion.

Figure 5:
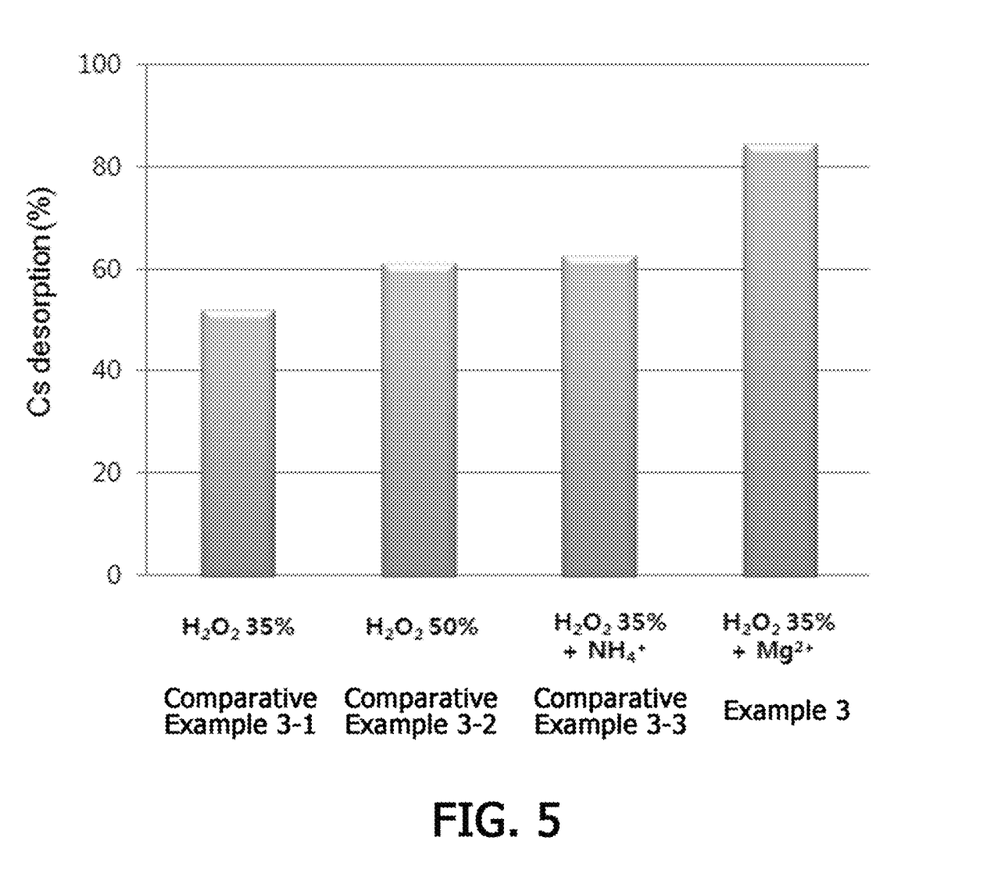
FIG. 5 is a comparison result of the efficiency of cesium desorption from illite according to an embodiment of the present invention.

As a result, as shown in FIG. 5, when only hydrogen peroxide was used, desorption efficiency of cesium insignificantly increased even though a concentration of hydrogen peroxide increased from 35% to 50%. Also, it can be seen that when an ammonium ion, which is a monovalent cation, was used together with hydrogen peroxide, a desorption efficiency similar to when only 50% hydrogen peroxide was used was exhibited, and when a magnesium ion was used together with hydrogen peroxide, a desorption efficiency significantly increased by 20% or more compared to when only 50% hydrogen peroxide was used.

According to the present invention, cesium in a clay mineral is removed using hydrogen peroxide, which serves to induce interlayer expansion of the clay mineral to allow a cation to easily enter an interlayer of the clay mineral, and thus cesium desorption efficiency can be further improved.

The method according to the present invention can be efficiently used to restore soil in residential areas widely contaminated with a radionuclide when a major accident such as Fukushima nuclear accident occurs as well as various sites of atomic energy facilities contaminated with a radionuclide. Also, since radiation-contaminated soil is treated with only hydrogen peroxide and cations, secondary environmental pollution caused by wastes can be significantly reduce and the waste disposing cost can also be saved.

The aforementioned description of the present invention is provided by way of example and those skilled in the art will understood that the present invention can be easily changed or modified into other specified forms without change or modification of the technical spirit or essential characteristics of the present invention. Therefore, it should be understood that the aforementioned examples are only provided by way of example and not provided to limit the present invention.

LIST OF REFERENCE NUMERALS

1. First reaction unit
2. Second reaction unit
3. Coagulation unit
4. Solid-liquid separation unit
5. Post-treatment unit

What is claimed is:

1. A method for removing cesium in a clay mineral, comprising:
    (a) mixing a cesium-contaminated clay mineral with hydrogen peroxide to induce interlayer expansion;
    (b) desorbing the cesium from the clay mineral by contacting the clay mineral with an ion-exchangeable cation; and
    (c) separating the desorbed cesium from the clay mineral.

2. The method of claim 1, wherein the clay mineral in step (a) includes a clay mineral having a 2:1 layered structure.

3. The method of claim 1, wherein the clay mineral in step (a) includes one or more selected from the group consisting of hydrobiotite, a smectite-based mineral, vermiculite, a mica-based mineral, and illite.

4. The method of claim 3, wherein the smectite-based mineral includes one or more selected from the group consisting of montmorillonite, beidellite, nontronite, hectorite, and sauconite.

5. The method of claim 3, wherein the mica-based mineral includes one or more selected from the group consisting of biotite, muscovite, phlogopite, and lepidolite.

6. The method of claim 1, wherein the hydrogen peroxide in step (a) is added as a 30 to 50% hydrogen peroxide aqueous solution.

7. The method of claim 1, wherein the cation in step (b) includes a divalent cation.

8. The method of claim 7, wherein the divalent cation is one or more selected from the group consisting of a magnesium ion, a calcium ion, and a barium ion.

9. A method for removing cesium in a clay mineral, comprising:
    (a) mixing a cesium-contaminated clay mineral with hydrogen peroxide to induce interlayer expansion;
    (b) desorbing the cesium from the clay mineral by mixing the clay mineral with an ion-exchangeable cation; and
    (c) separating the desorbed cesium from the clay mineral.

* * * * *